Oct. 14, 1924.

S. I. CORY 1,511,756

ELECTRICAL TESTING SYSTEM

Filed July 16, 1921

INVENTOR
S. I. Cory
BY
ATTORNEY

Patented Oct. 14, 1924.

1,511,756

UNITED STATES PATENT OFFICE.

SAMUEL I. CORY, OF ELMHURST, NEW YORK, ASSIGNOR TO AMERICAN TELEPHONE AND TELEGRAPH COMPANY, A CORPORATION OF NEW YORK.

ELECTRICAL TESTING SYSTEM.

Application filed July 16, 1921. Serial No. 485,207.

*To all whom it may concern:*

Be it known that I, SAMUEL I. CORY, residing at Elmhurst, in the county of Queens and State of New York, have invented certain Improvements in Electrical Testing Systems, of which the following is a specification.

This invention relates to electrical testing systems and particularly to an arrangement for determining the existence of unbalance between two networks, such as a signal transmission line and its balancing network.

In the operation of duplex telegraph circuits, it is necessary to obtain a high degree of balance between the line circuit and its balancing network in order to prevent the signaling currents transmitted from any station from interfering with the reception of signals from a distant station. A method for determining the existence of unbalance between a line and its balancing network, which has been used heretofore, consists in the use of a line milliammeter connected differentially in the middle of the windings of the line relay. With such an arrangement, balance was obtained by adjusting the balancing network while transmitting a definite signal by hand, the distant transmitter being held on either its marking or spacing contact. The best balance was indicated when the movement of the meter needle was a minimum. Since the meter had a decided period and damping of its own, this method of determining the magnitude of an unbalance did not prove sufficiently accurate for use in connection with the investigation of the balance of duplex metallic telegraph circuits, where it was necessary to obtain very fine balance on account of the large number of repeaters used on long circuits.

It is the object of the present invention to provide means for determining with greater accuracy the magnitude of unbalance that exists between a line circuit and its balancing network, and to facilitate the adjustment of the network so as to reduce the unbalance to a minimum.

Figure 1:
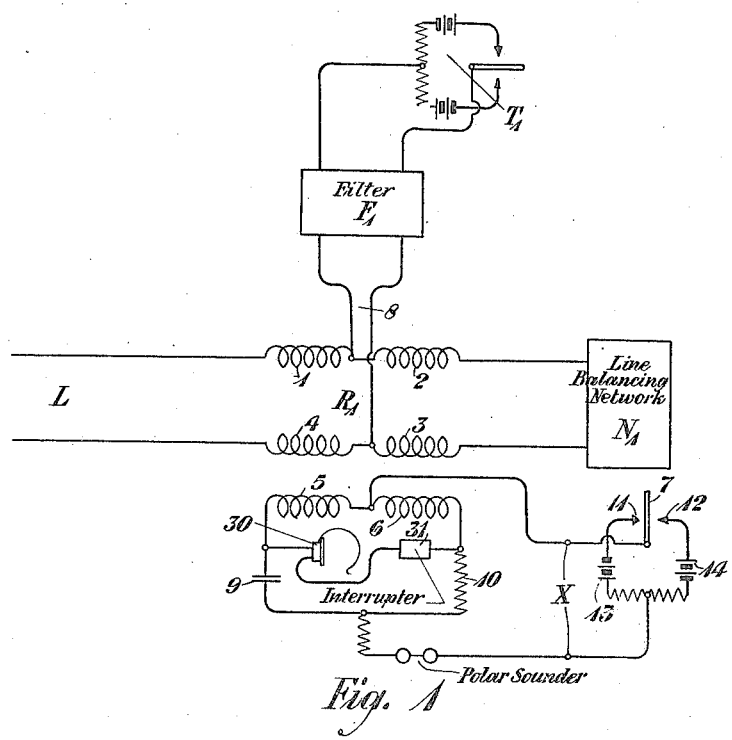
Figure 2:
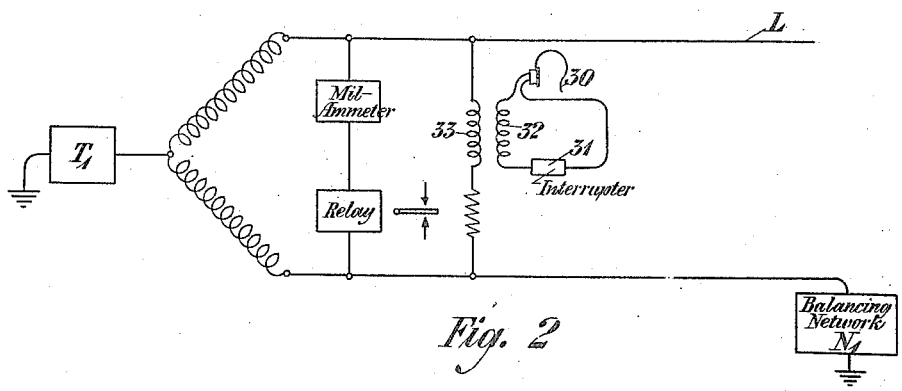

This invention will be better understood from the following description, when read in connection with the attached drawing, of which Figure 1 shows the application of the invention to a duplex metallic telegraph circuit, and Fig. 2 shows its application to a duplex grounded telegraph circuit.

In Fig. 1, the line L connects the terminal circuit shown in the figure with another station remote therefrom, having terminal equipment in general similar to that represented by Fig. 2. Associated with the line L is a network $N_1$, the function of which is to balance the line L. Connected between the line L and its network are the windings 1, 2, 3 and 4 of the relay $R_1$ which are wound on the same core and arranged in series with the sides of the line, as shown in the drawing. The relay $R_1$ has two other windings, 5 and 6, also wound upon the same core as the winding 1 to 4, inclusive, and connected in a local circuit termed the vibratory circuit, which assists in the operation of the relay $R_1$. The armature 7 of the relay $R_1$ is controlled by the magnetization of the core, on which the windings 1 to 6, inclusive, are arranged. This vibratory circuit has connected therewith, in addition to the windings 5 and 6, a condenser 9 and a resistance 10. Bridged across the vibratory circuit between the junction point of the windings 5 and 6 and the junction point of the condenser 9 and resistance 10 is a circuit including the armature 7, and sources of potential 13 and 14 connected with its contacts 11 and 12. This is shown, because it constitutes part of the duplex circuit which has been chosen to illustrate the application of the present invention, but, in carrying out the method constituting this invention the circuit that includes the armature and associated parts is opened at the points indicated X. Bridged across the junction points of windings 1 and 2 and windings 3 and 4, respectively, is a transmitter output circuit 8, having associated therewith a filter $F_1$, which is adapted to round off signals impressed upon the said transmitter circuit by means of the transmitting device $T_1$. Bridged across the vibratory circuit between the junction point of the winding 5 and condenser 9, and the junction point of the winding 6 and resistance 10, is a path containing a telephone receiver 30 and an interrupter 31, adapted to break up and render audible any current of non-audible frequency flowing through the said path. The terminal equipment located at the distant station of the line L is preferably of the same type as shown in the drawing, excepting that the bridged circuit containing the receiver 30 and interrupter 31 has been omitted.

Having in mind the foregoing description of the circuit shown in Fig. 1, the invention will now be clearly understood from the following description of the mode of operation of the circuit. If then, signals of a definite character, such, for example, as a signaling wave comprising a series of reversals of a definite frequency, are impressed by the transmitter $T_1$ upon its output circuit 8 and thereby impressed across the junction points of the line windings of the receiving relay $R_1$, as shown in the drawing, the current from the said transmitter will divide equally between the parallel paths viz:—the line circuit L and the network $N_1$, if the respective impedances of the two paths are equal. If they are unequal, the resultant current will induce a corresponding difference of potential in the windings 5 and 6 of the vibratory circuit, which will tend to cause current to flow through the path containing the receiver 30 and the interrupter 31. These induced currents may be of relatively low frequency and, therefore, incapable of being detected by the receiver connected across the sides of the output circuit as shown in the drawing. Due to the presence of the interrupter 31 in the said path, the currents flowing therein will be broken up and rendered audible, and an approximation of the magnitude of the existing unbalance may be gained by the loudness of the tone produced by the telephone receiver.

Since the circuit of the armature 7 and its associated apparatus is disconnected from the vibratory circuit at the points X, it is immaterial whether current is flowing over the line from the distant station as the result of the tongue of the transmitter at the distant station resting against one of its contacts, or whether no current is flowing due to the replacement of the transmitting batteries by suitable resistance.

It will be seen, therefore, that by means of the arrangement shown in the drawing, the existence of unbalance between a line and its balancing network may be determined and the relative magnitude of the unbalance may also be made known. By listening to the tone produced by the telephone receiver when signals are transmitted at a predetermined rate by the transmitter $T_1$, and by adjusting the artificial network $N_1$ until the tone is a minimum, the unbalance between the network and its line L may in like manner be reduced to a minimum.

The arrangement in Fig. 2 shows a grounded duplex circuit which differs from that shown in Fig. 1 principally in the placing of the receiver 30 and the interrupter 31 in a local circuit, which is inductively connected with the terminal circuit by means of the transformer 32. If the network $N_1$ does not exactly balance the line L, current will flow through the winding 33 of the transformer 32 whenever a signaling impulse is transmitted by the transmitter $T_1$ connected with the terminal circuit. The current flowing through the winding 33 will induce current in the local circuit in which the telephone receiver and interrupter are located, and the unbalance current will be rendered audible by being broken up by the interrupter 31. The transformer 32 serves the purpose of keeping direct current out of the circuit containing the telephone receiver in case the distant transmitter is connected with the line L. The network $N_1$ shown in Fig. 2 may then be adjusted until substantially no tone is received by the receiver 30, which indicates that substantial balance has been effected between the line L and its balancing network.

Although this invention is shown as applied to a duplex telegraph circuit, it is to be understood that it is not so limited but is capable of embodiment in other and different forms of circuits without departing from the spirit and scope of the appended claims.

What is claimed is:

1. The method for detecting unbalance between two electrical networks which consists in impressing telegraph signaling impulses across said networks, allowing the resultant current to induce an electromotive force in a receiving circuit, interrupting the resultant induced current and detecting the interrupted current.

2. The method for detecting unbalance between two electrical networks which consists in impressing telegraph signaling impulses across said networks, allowing the resultant current to induce an electromotive force in a receiving circuit, changing the frequency of the induced current and detecting the current by a telephone receiver.

3. The method for detecting unbalance between a line circuit and its balancing circuit, which consists in impressing telegraph signaling impulses across the two circuits in parallel, allowing the resultant current to induce an electromotive force in a receiving circuit, and detecting the resultant induced current by audible detecting means.

4. In a duplex telegraph signaling system, the combination with a transmitting circuit, of a plurality of networks connected in parallel thereto, a receiving circuit inductively connected with the other of said circuits in such manner that current in the said transmitting circuit will not induce an electromotive force in the receiving circuit if the said networks are equivalent electrically, and detecting means connected with the said receiving circuit responsive to currents induced therein to indicate the existence of unbalance between the said networks.

5. In a duplex telegraph signaling system, the combination with a transmitting circuit, of a plurality of networks connected in parallel thereto, a receiving circuit inductively connected with the other of said circuits in such manner that current in the said transmitting circuit will not induce an electromotive force in the receiving circuit if the said networks are equivalent electrically, and detecting means connected with the said receiving circuit comprising a telephone receiver and an interrupter whereby currents induced by the transmitting circuit in the said receiving circuit, due to unbalance between the said networks may be detected.

6. In a duplex telegraph signaling system, the combination with a transmitting circuit, of a receiving circuit, a line circuit, a network intended to balance the said line circuit, a relay having a plurality of windings whereby the said circuits and network are electrically connected and so disposed that the impulses from the said transmitting circuit will not affect the receiving circuit if the network exactly balances the line circuit, and audible detecting means connected with said receiving circuit and responsive to the currents induced in the receiving circuit to indicate unbalance between the network and the line circuit.

7. In a duplex telegraph signaling system, containing a transmitting circuit, a receiving circuit, a line circuit and a network to balance the said line circuit, and means for electrically connecting the said circuits characterized by the protection of the said receiving circuit from interference from the said transmitting circuit if the line circuit and the network are balanced, the method of detecting the existence of unbalance between the line circuit and its network, which consists in impressing low frequency variations by the said transmitting circuit across the line circuit and its network in parallel, allowing the resultant current to impress electromotive force across said receiving circuit and detecting the said induced electromotive force by interrupting the resultant current.

In testimony whereof, I have signed my name to this specification this 15th day of July, 1921.

SAMUEL I. CORY.